March 12, 1940.　　　　　L. F. JETT　　　　　2,193,423
FLOAT GAUGE FOR SHIPS
Filed Nov. 11, 1937　　　2 Sheets-Sheet 1

INVENTOR:
Lowell F. Jett,
BY
His ATTORNEY.

Patented Mar. 12, 1940

2,193,423

UNITED STATES PATENT OFFICE 2,193,423

FLOAT GAUGE FOR SHIPS

Lowell F. Jett, Elizabeth, N. J.

Application November 11, 1937, Serial No. 174,069

7 Claims. (Cl. 73—321)

This invention relates to indicators for the gauging of liquids in cargo and storage tanks and has for its particular objects the provision of an instrument of the float gauge type which is unusually efficient, cheap to manufacture and of simple and sturdy construction. Other objects of the invention are the provision of an instrument wherein the counterweight, which is attached to the float, travels but a small fraction of the total distance which said float moves, thus admitting of the employment of an extremely short guide for the counterweight. Consequently such guide is much easier to install on a tanker and when so installed is far less likely to become fractured or disaligned when subjected to excessive strains in sea way, than is the case where the counterweight travels the entire depth of the tank and guide therefor extends from the upper deck of the ship clear to the bottom thereof. Further objects of the invention will hereafter appear.

In the accompanying drawings, in which I have illustrated a preferred embodiment of my invention installed on an oil tanker:

Figure 1:
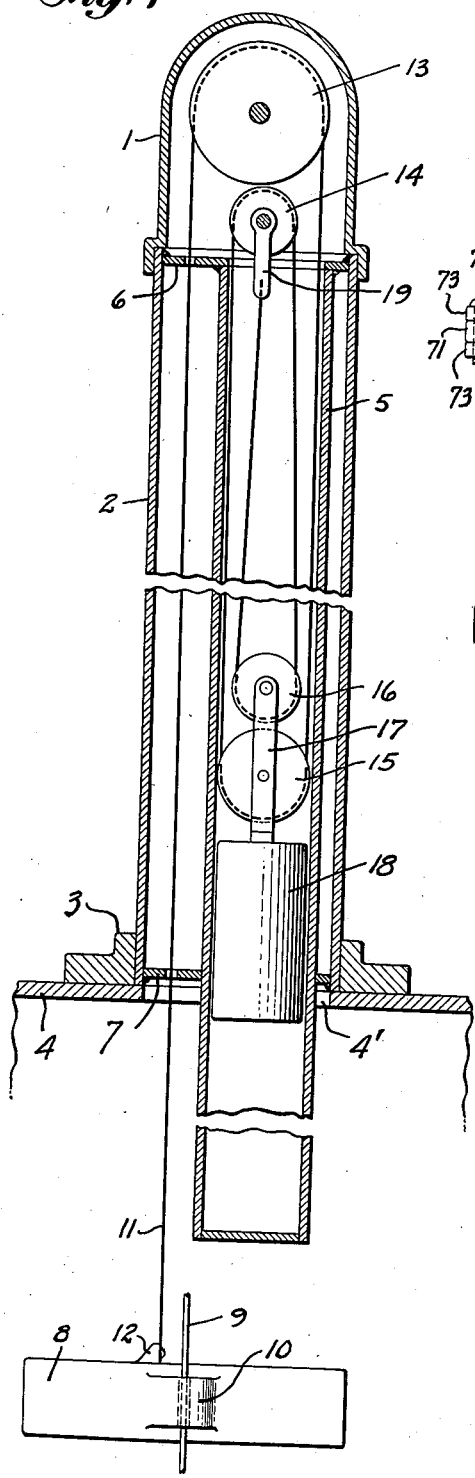
Figure 1 is a central, vertical, transverse section, partly in elevation, of such float gauge showing a fragment of the deck on which it is mounted.
Figure 2:
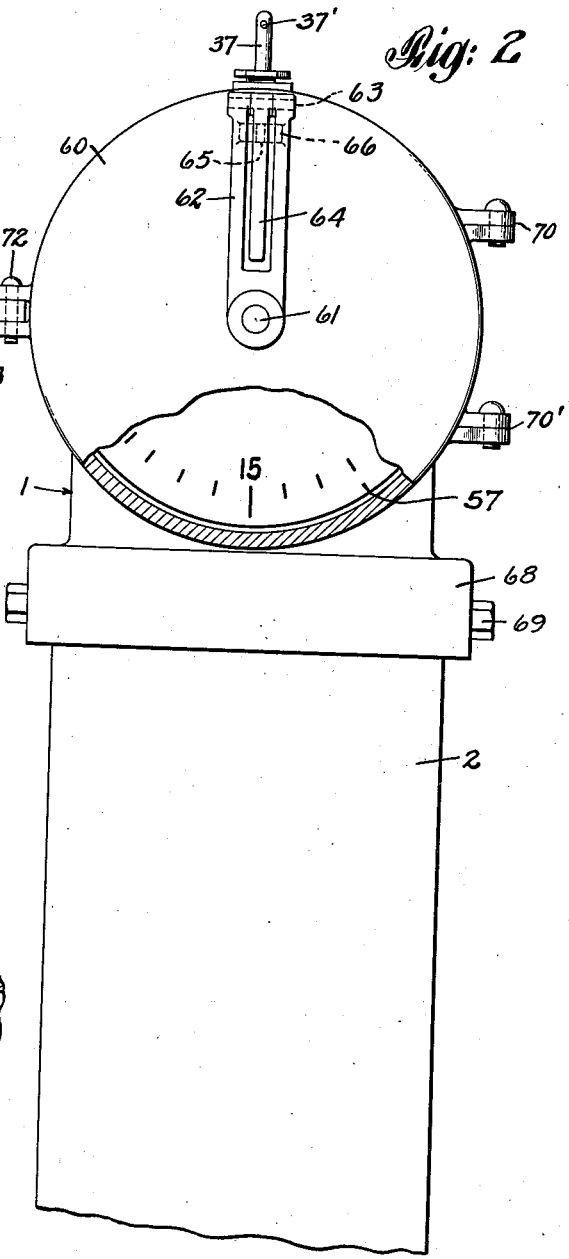
Fig. 2 is a fragmentary, front elevation of said float gauge, viewed from the front of the dial thereof.
Figure 3:
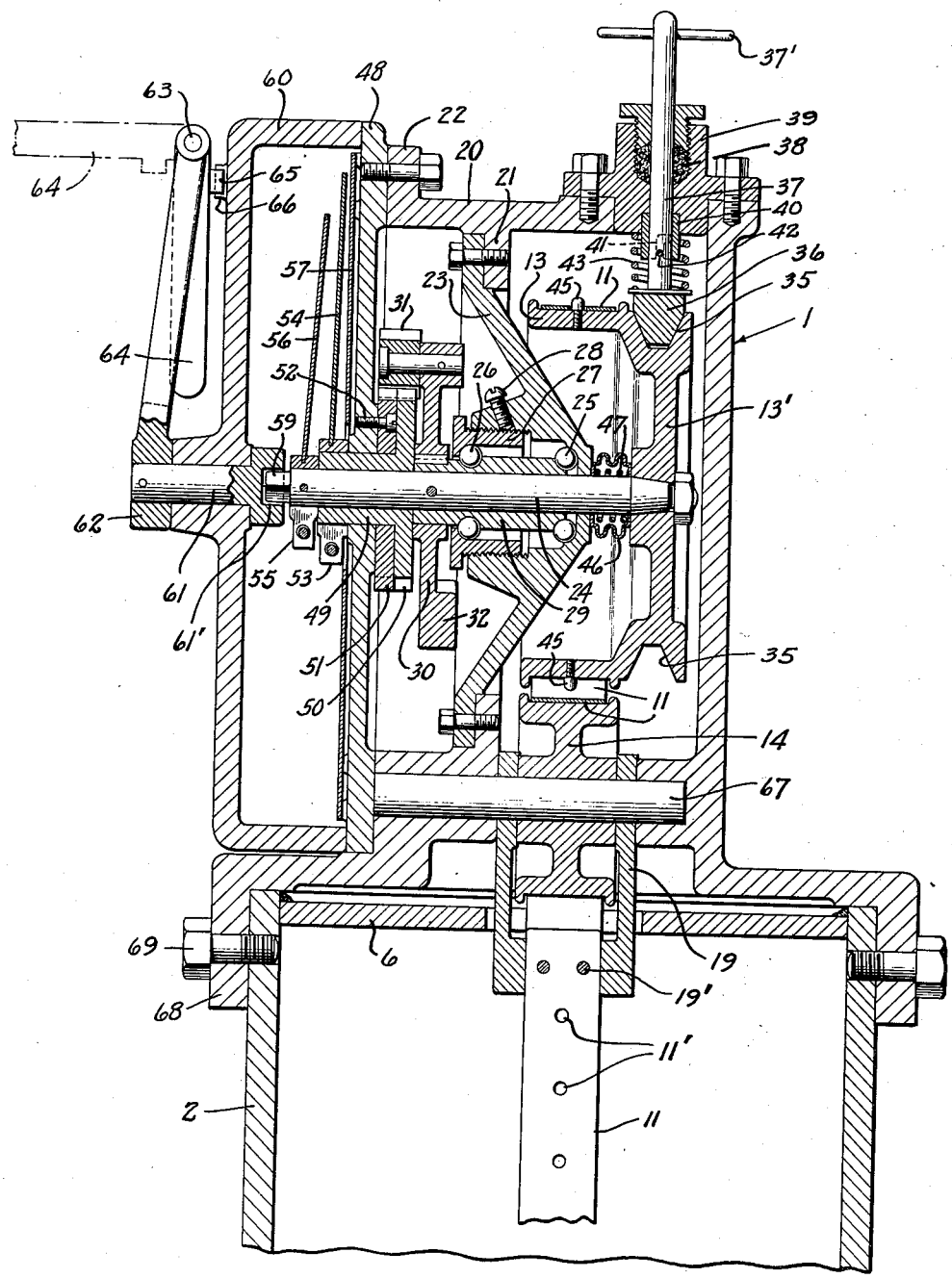
Fig. 3 is a fragmentary, vertical longitudinal section, partly in elevation of such float gauge.

Referring to the drawings and the construction shown therein, the reference numeral 1 designates the shell of the recording mechanism of my improved gauge. Said shell is mounted on the upper end of a tubular housing 2 that is inserted in a flange 3, which latter is secured to the deck 4 of a tanker and surrounds the aperture 4' formed in said deck. Within said housing is suspended a tubular, counterweight guide 5, the same being closed at the bottom thereof, and being preferably welded or otherwise secured to a transverse apertured partition 6 that is rigidly secured in said housing 2 adjacent the bottom of the bonnet thereof. As shown, said guide extends through the second apertured partition 7, which latter is rigidly secured in said housing 2 adjacent the bottom thereof.

A float member 8, desirably comprising a hollow casting of an aluminum alloy, is slidably mounted between parallel, vertical guide wires 9 (only one of which is shown), which pass through opposing lateral bosses 10 formed on said float and are secured at their upper and lower ends in the well known manner to the top and bottom of the tank, respectively.

A hoisting line 11, preferably comprising a metal tape composed of a nickel alloy and having an axial series of apertures 11' formed therein, is connected to a boss 12 on said float and is reeved over a standing sheave 13 which is rotatably mounted in the shell 1. Said sheave 13 is extended laterally to form a brake drum 13' which functions as hereinafter described. A hoisting tackle is supported on the partition 6, the same comprising a standing block 14 and two running blocks 15 and 16, both of which are rotatably mounted within a cheek-piece 17 from which is suspended a counterweight 18. From the sheave 13 the tape 11 is successively reeved over the block 15, block 14 and block 16, being secured at its end at the bottom of the cheek-piece 19 of said block 14.

The top 20 of the shell 1 has a depending annular flange 21 and an external marginal flange 22. A journal box 23 is bolted around its periphery to the flange 21. The shaft 24 of the indicating mechanism to which, as stated, the sheave 13 is secured, is rotatably mounted in a ball-bearing carried by said journal box. Said ball-bearing comprises a series of balls 25 and 26, a threaded bushing 27, that is adapted to be locked in any adjusted position by means of a set screw 28, and a sleeve 29 which is rigidly secured to the shaft 24 and is peripherally grooved to form raceways for two series of balls 25 and 26. The adjustment of the bushing 27 inwardly with respect to the journal box 23 serves to drag with it and consequently adjust the sleeve 29 which is rigidly pinned to the shaft 24.

An arm 30, which is splined to the sleeve 29, carries a pinion 31 at one end thereof and has a counterweight 32 at its opposite end.

The drum 13' has a wedge-shaped peripheral groove 35 for the reception of a wedge-shaped brake-shoe member 36 that is mounted on the lower end of a rod 37 which is adapted to be operated by a handle 37'. Said rod extends through a packing gland 38 in the fitting 39 and thence through a depending bushing 40 that is secured to the shell 1. Said bushing has a bayonet slot 41 formed therein which is adapted to receive a pin 42 carried by rod 37 and permits of the rod 37 being locked in an elevated position when the brake shoe is released from engagement with the cooperating grooved drum 13'.

A series of fixed pins 45 are centrally mounted in the upper face of the sheave 13, the spacing therebetween corresponding to that between the aforesaid spaced central apertures 11' formed in the tape 11, whereby said sheave functions as a sprocket, so to speak, and prevents slippage of said tape relative to said sheave 13 when the latter is rotated.

A flexible metal bellows 46, which is normally expanded by a coil spring 47, is interposed between the outer end of the journal box 23 and the hub, the said bellows serving as a hermetic seal to prevent the escape of gas from the tank, along the shaft 24 and into the indicating instrument.

A cover-plate 48 is bolted to the casing 1, the same having a central aperture for the reception of the hub 49 of a movable gear 50. Associated with the latter gear is a stationary gear 51 which is secured by means of a cap screw 52 to said cover 48. These gears each have a different number of teeth, the stationary gear 51 having one tooth less than the gear 50 when it is desired that the indicating instrument should register "ullage", i. e., outage, as is customary in the case of the cargo of tankers and when the gauge is employed for directly registering the actual depth of the tank contents, as is customary when measuring the oil in refinery tanks or on tank farms, the gear 51 should have one more tooth than the gear 50. The number of teeth on the gear 50 when the depth is to be measured in feet and inches, is desirably the same as the depth of the tank to be measured, expressed in feet, for example for a forty foot tank the gear 50 should have forty teeth and if it is a cargo tank, then the gear 51 should have thirty-nine teeth. With such gear ratios between the gears 50 and 51, the gear 50 will be retarded one step for each complete rotation of the pinion around the periphery of the stationary gear 51 which corresponds to a complete rotation of the shaft 24 in an anti-clockwise direction (when viewed from the face of the instrument dial). However, when the gear 51 has one more tooth than the gear 50, say 41 as opposed to 40, then the dial will indicate directly the depth of the tank contents since the gear 50 will be advanced one step in each complete rotation of the shaft 24 in a clockwise direction.

A split-collar 53 is clamped to the hub 49, the same carrying a pointer 54 and a second split-collar 55, carying a pointer 56, is clamped to the shaft 24 adjacent its outer end and also preferably, though not necessarily, pinned thereto. When taking ullage of a cargo tank, each of said pointers, during the rotation of the shaft 24, passes anti-clockwise over the dial 57, the former pointer 54 moving continuously and being accelerated one step in the manner hereinbefore described during the complete revolution of the pointer 56, thereby said pointer 54 registering the ullage in "feet" and the pointer 56 the ullage in "inches", the latter being preferably indicated on a separate, concentric scale on said dial (not shown).

The end 59 of the shaft 24 is square and this admits of the shaft being manually operated and adjusted in the manner hereinafter described.

A flanged door 60 is hinged, as hereinafter described, to the cover-plate 48, said cover being centrally apertured to receive a stub shaft 61, the inner end of which is provided with a square aperture 61' to receive the square end 59 of the shaft 24. A sectional crank comprising an arm 62, which is pinned to the outer end of the stub 61 and which serves as a journal for a pin 63 carried by a supplemental arm or handle 64, admits of the manual rotation of the shaft 24 when the pressure of the brake shoe 36 on the drum 13' is relieved. Said arm 64 has a lug or stop 65 which is adapted to engage a corresponding lug or stop formed on the cover 60 and thereby prevents rotation of said shaft when the tank is empty and the float has been raised, as is then desirable, to the maximum cargo level by the operation of the crank 62.

The block 14 rotates on a pin 67 secured in the bottom of the shell 1. As shown, said shell 1 has a flange 68 at its lower end which is secured by cap screws to the housing 2.

The cover is preferably mounted on hinges 70, 70' and an apertured lug 71 carried by the plate 48 is adapted to receive a locking pin 72 when the apertures formed in opposing lugs 73 carried by said door are in registry with the aperture in the lug 71.

The manner of operation of my improved gauge is as follows:

The operator opens the dial cover thus releasing the positive mechanical lock between the stub-shaft 61 and the square end 59 of shaft 24. The "inch" pointer is then held against rotation while the friction brake is released and the float is gradually lowered by rotation of the pointer in a counter-clockwise direction until the float rests on the surface of the liquid cargo in the tank. The pointer is then released by the operator. In this condition the float and mechanism should operate freely and the pointers will indicate the level of carbon and will automatically indicate any changes of level if cargo is being loaded or discharged.

When cargo is entering or leaving the tank at any appreciable rate, the "inch" pointer can be observed in motion. As long as the mechanism and float move freely and the pointers move with any variation of cargo level, the correct cargo level will be indicated.

In order to originally set the pointers, the clamping collars are loosened, the pin of the collar 55 removed and the shaft 24 is rotated until the float reaches the maximum cargo level. The shaft is then locked by applying the brake. The "foot" pointer 54 is then turned to the correct reading for "full ullage" and then the same is clamped to the hub 49. The "inch" pointer is then turned to the position to also indicate full ullage and clamped to the shaft in that position and if desired, the pin is inserted through a fresh hole drilled through the collar 55 at the proper point.

In the construction herein shown, the "hoisting ratio" is such that the counterweight moves but one-quarter the distance that is travelled by the float. Consequently, in a tank of 40 ft. in depth, the tubular guide pipe for the counterweight extends into the tank only a few feet, say ten to twelve feet, as distinguished from the usual guide, now commonly employed, which extends the full depth of the tank. Accordingly, even in the roughest weather such guide pipe being secured only to the tank top is not subjected to any stresses which would injure or disalign the same. Furthermore, such relatively short guide pipes are extremely simple and easy to install and maintain since, with the exception of the guide wires and float, the entire unit can be inserted or withdrawn through the opening 4' in the tank top and it is only for the purpose of installing the guide wires or for inserting and removing the float (which latter is of a size to pass through the hatch opening of a cargo tank) that it is necessary for an operative to enter the tank.

My improved gauge is of especial importance in the oil and allied industries wherein cargoes having high vapor pressures, as petroleum and coal tar distillates for example, since such cargoes, due to contraction and expansion under the varying conditions to which they are subjected, develop varying pressures in the space above the cargo level due to gases and vapors evolved therefrom, and consequently the employment of gauges which operate on the pressure principle is precluded for use on tanks transporting or storing such cargoes.

Obviously, the pointers may also be rotated by first closing the cover and then operating the crank 62 by means of the handle 64, in lieu of manually grasping the pointers. Also, when originally setting the pointers, the float can first be raised to the maximum cargo level before loosening the pointers either by directly grasping and rotating the "inch" pointer or by closing the cover and operating the hand crank 62. If desired, also the lowering of the float to the cargo level may be accomplished by resorting to a so-called "inching" manipulation of the brake in lieu of manually grasping and rotating the pointer.

My improved gauge is so designed that the dial is clearly visible from a distance and consequently can easily be observed either by the operator of the valves of the supply or discharge line or by the supervisor of loading and accordingly fewer men are required than are now usually employed to properly load or discharge the cargo and to enable the maintenance of the proper trim of the vessel during such loading or unloading.

Various changes in the details of the herein described construction of my improved float gauge may be made without departing from the spirit of my invention as embraced within the scope of the appended claims.

Having thus described my invention, what I claim and desire to obtain by United States Letters Patent is:

1. In a float tank gauge, the combination comprising a housing adapted to be secured to a tank top, a guide extending vertically within said housing and secured thereto, a counter-weight slidably mounted in said guide, a float member, a hoisting drum rotatably mounted in said housing adjacent the upper end of the guide, a hoisting tackle including a standing block and two running blocks mounted in said housing and said running blocks being within said guide and supporting said counterweight, and a hoisting line connected at one of its ends to said float and successively reeved over said hoisting drum, thence over one of the running blocks, thence over the standing block, thence over the other running block and having its other end secured to a fixed support.

2. The combination with a tank and a stand pipe extending upwardly therefrom, of a vertical guide mounted within said stand pipe and extending into said tank but a small fraction of the total depth of said tank, a hoisting tackle supported above said tank and having a portion thereof slidably mounted within said guide, said tackle including a standing block and two running blocks, the latter being adapted to move together in a vertical plane and having a counterweight supported by the cheek-piece of one of said blocks, a hoisting drum mounted above said tackle, a float positioned in said tank, vertical guide means for said float and a hoisting line connected at one of its ends to said float and successively reeved over said hoisting drum, thence over one of said running blocks, thence over said standing block, thence over the other of said running blocks and having its other end secured to a fixed support.

3. The combination of claim 2, the guide thereof comprising a receptacle having a closed bottom which extends into the tank a distance less than half the depth of said tank.

4. The combination of claim 2, in which the hoisting tackle thereof insures that the counterweight shall travel but one-quarter the distance travelled by the float and the extent of the projection of the guide into the tank is less than one-third of the depth of said tank.

5. In a tank float gauge, the combination comprising a housing adapted to be secured to a tank top, a main shaft rotatably mounted in said housing, a swinging door hinged to said housing, a stub shaft mounted in said door, said stub shaft having a handle secured to its outer end and means carried by its inner end for effecting operative engagement with said main shaft when the door is in a closed position whereby rotation of said shaft by said handle can be accomplished, a hoisting drum carried by said shaft, a vertical guide depending from said housing and adapted to project into a tank on which said housing is mounted, a counterweight mounted within said guide, a hoisting tackle having a portion thereof slidably mounted within said guide, said tackle including a standing sheave block and two running sheave blocks, the latter carried by said counterweight and being adapted to move vertically during the operation of said tackle, a hoisting tape reeved over said drum and then successively over one of the movable blocks, thence over the fixed block and thence over the other movable block, one end of said tape being secured to a fixed support and braking means for holding said float in an elevated position and for gradually lowering the same, when desired, when the handle is operatively disengaged from said main shaft.

6. The combination as claimed in claim 1 wherein the hoisting drum is mounted on a shaft that is rotatably supported in a housing which is secured to the top of said tank and said housing is provided with a swinging door hinged thereto and which door has a stub shaft mounted therein which is provided on its inner end with means for operatively connecting said main shaft and said stub shaft together when said door is closed and said stub shaft having a collapsible handle secured to its outer end for effecting rotation of the stub shaft and said main shaft when the same are operatively engaged with each other.

7. In a tank float gauge, the combination comprising a main shaft, a hoisting drum mounted thereon, a hoisting line supported thereby, a float member and a counterweight each supported by said hoisting line, a hoisting tackle, including a standing sheave block and two movable sheave blocks over all of which blocks said hoisting line is reeved, an indicator operatively associated with said main shaft, a housing having a swinging door hinged thereto enclosing said indicator and said drum and in which said main shaft is rotatably mounted, a stub shaft mounted on said door, cooperating means formed on the inner end of said stub shaft and the outer end of said main shaft for effecting their operative engagement when said door is in a closed position, an operating handle for effecting rotation of said stub shaft and a brake for locking said main shaft and holding said float in an elevated position and for gradually lowering said float, if desired, when the door is opened.

LOWELL F. JETT.